(12) United States Patent
Zhu et al.

(10) Patent No.: US 12,185,194 B2
(45) Date of Patent: Dec. 31, 2024

(54) METHODS AND DEVICES FOR SELECTING RADIO BEARER MODE FOR MULTICAST BROADCAST SERVICES

(71) Applicant: ZTE Corporation, Shenzhen (CN)

(72) Inventors: Hao Zhu, Shenzhen (CN); Lin Chen, Shenzhen (CN); Zijiang Ma, Shenzhen (CN); Tao Qi, Shenzhen (CN); Feng Xie, Shenzhen (CN); Ying Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/963,731

(22) Filed: Oct. 11, 2022

(65) Prior Publication Data
US 2023/0044660 A1   Feb. 9, 2023

Related U.S. Application Data

(63) Continuation of application No. PCT/CN2020/084419, filed on Apr. 13, 2020.

(51) Int. Cl.
*H04W 4/06* (2009.01)
*H04W 28/02* (2009.01)

(52) U.S. Cl.
CPC ......... *H04W 4/06* (2013.01); *H04W 28/0268* (2013.01); *H04W 28/0284* (2013.01)

(58) Field of Classification Search
CPC .............. H04W 4/06; H04W 28/0268; H04W 28/0284
See application file for complete search history.

(56) References Cited

U.S. PATENT DOCUMENTS

| | | | | |
|---|---|---|---|---|
| 6,973,081 B1* | 12/2005 | Patel | ............... | H04L 12/1881 370/390 |
| 8,780,777 B2* | 7/2014 | Cai | ............... | H04W 72/30 725/62 |
| 9,769,862 B2* | 9/2017 | Sheng | ............... | H04W 76/14 |
| 10,804,989 B2* | 10/2020 | Chen | ............... | H04W 24/08 |
| 11,570,752 B2* | 1/2023 | Zhang | ............... | H04W 72/23 |
| 11,589,352 B2* | 2/2023 | Kim | ............... | H04W 76/40 |

(Continued)

FOREIGN PATENT DOCUMENTS

| | | |
|---|---|---|
| CN | 103458370 A | 12/2013 |
| EP | 4124166 A1 * | 1/2023 |
| WO | WO 2019196608 A1 | 10/2019 |

OTHER PUBLICATIONS

International Search Report and Written Opinion regarding PCT/CN2020/084419 dated Dec. 30, 2020, 7 pages.

(Continued)

*Primary Examiner* — Parth Patel
(74) *Attorney, Agent, or Firm* — Crowell & Moring LLP

(57) ABSTRACT

The present disclosure describes methods, system, and devices for selecting a radio bearer mode for multicast broadcast services (MBS). The method includes informing a radio access network (RAN) that a user equipment (UE) is receiving/interested to receive or no longer receiving/interested to receive multicast broadcast service (MBS) services via a cast mode. The method includes sending, by the UE, MBS interest information to the RAN, the MBS interest information comprising a list of MBS services of interest.

15 Claims, 8 Drawing Sheets

(56) References Cited

U.S. PATENT DOCUMENTS

| | | | | |
|---|---|---|---|---|
| 2004/0156332 | A1* | 8/2004 | Terry | H04W 36/10 |
| | | | | 370/328 |
| 2009/0180417 | A1* | 7/2009 | Frost | H04W 72/30 |
| | | | | 370/312 |
| 2010/0315987 | A1* | 12/2010 | Kuo | H04W 72/30 |
| | | | | 370/312 |
| 2013/0242738 | A1* | 9/2013 | Chang | H04W 76/27 |
| | | | | 370/312 |
| 2014/0301267 | A1* | 10/2014 | Gou | H04W 48/08 |
| | | | | 370/312 |
| 2018/0014246 | A1* | 1/2018 | Chang | H04W 4/06 |
| 2018/0279275 | A1* | 9/2018 | Chen | H04W 72/23 |
| 2019/0149958 | A1* | 5/2019 | Zhang | H04W 4/029 |
| | | | | 455/456.1 |
| 2019/0158985 | A1* | 5/2019 | Dao | H04L 63/0428 |
| 2019/0208369 | A1* | 7/2019 | Kim | H04W 4/06 |
| 2019/0223250 | A1* | 7/2019 | Dao | H04W 72/23 |
| 2019/0289504 | A1* | 9/2019 | Kim | H04W 36/0061 |
| 2019/0306670 | A1* | 10/2019 | Lipfert | H04W 4/06 |
| 2020/0351639 | A1* | 11/2020 | Shrivastava | H04W 76/40 |
| 2021/0075631 | A1* | 3/2021 | Liao | H04W 4/24 |
| 2021/0105196 | A1* | 4/2021 | Dao | H04L 43/026 |
| 2021/0204248 | A1* | 7/2021 | Zhang | H04W 72/30 |
| 2021/0258223 | A1* | 8/2021 | Rico Alvarino | H04W 72/0453 |
| 2021/0306824 | A1* | 9/2021 | Li | H04W 4/40 |
| 2022/0225434 | A1* | 7/2022 | Kim | H04W 76/30 |
| 2022/0322169 | A1* | 10/2022 | Park | H04W 36/0033 |
| 2022/0329983 | A1* | 10/2022 | Jeong | H04W 12/06 |
| 2022/0338291 | A1* | 10/2022 | Hong | H04L 5/0087 |
| 2022/0400358 | A1* | 12/2022 | Son | H04W 4/06 |
| 2023/0007445 | A1* | 1/2023 | Zhong | H04W 76/11 |
| 2023/0017217 | A1* | 1/2023 | Zhu | H04W 76/40 |
| 2023/0027425 | A1* | 1/2023 | Zhu | H04W 36/0085 |
| 2023/0029146 | A1* | 1/2023 | Kadiri | H04W 36/0007 |

OTHER PUBLICATIONS

3GPP. "3GPP TR 23.757 V.3.0" 1-6. 32, 33 *3rd Generation Partnership Project; Technical Specification Group Services and System Aspects; Study on architectural enhancements for 5G multicast-broadcast services (Release 17)*, Jan. 31, 2020.

Huawei et al. "*Upgrade of KI#I: MBS session management S2-2001538*" *3GPP TSG SA2 Meeting #136AH*, Jan. 17, 2020.

Ericsson et al. "*RAN shanng with multiple Cell ID broadcast R3-191804*" *3GPP TSG-RAN WG3 Meeting #103bis*, Apr. 12, 2019

* cited by examiner

400 sending, by the UE, a MBS interest information to the RAN, the MBS interest information comprising a list of MBS services of interest

410

600 sending, by a user equipment (UE), a MBS service request information to a core network (CN)
610 sending, by the core network (CN), a multicast broadcast service (MBS) session management information to a radio access network (RAN)
620

800 sending, by a new generation radio access network node distributed unit (gNB-DU), multicast broadcast service (MBS) resource status information to a gNB central unit (gNB-CU) to inform the gNB-CU about a resource status for a MBS service in the gNB-DU
810

1000 sending, by a new generation radio access network node distributed unit (gNB-DU), multicast broadcast service (MBS) notify information to a gNB central unit (gNB-CU) to inform the gNB-CU that a quality of service (QoS) of an already established guaranteed bit rate (GBR) radio bearer (RB) associated with a MBS session cannot by fulfilled any longer or that it can be fulfilled again   1010

1102 gNB-DU 1104 gNB-CU

1110: F1AP message (MBS notify information)

FIG. 11

METHODS AND DEVICES FOR SELECTING RADIO BEARER MODE FOR MULTICAST BROADCAST SERVICES

CROSS-REFERENCE TO RELATED APPLICATION

This application is a continuation application of PCT International Patent Application No. PCT/CN2020/084419, filed with the China National Intellectual Property Administration, PRC on Apr. 13, 2020, which is herein incorporated by reference in its entirety.

TECHNICAL FIELD

The present disclosure is directed generally to wireless communications. Particularly, the present disclosure relates to methods and devices for selecting a radio bearer mode for multicast broadcast services (MBS).

BACKGROUND

Wireless communication technologies are moving the world toward an increasingly connected and networked society. High-speed and low-latency wireless communications rely on efficient network resource management and allocation between user equipment and wireless access network nodes, including but not limited to radio access network (RAN). The RAN may communicate with one or more user equipment (UE) with a wireless radio bearer (RB) for multicast broadcast services (MBS). The wireless radio bearer may be a point-to-point (PTP) or a point-to-multipoint (PTM) radio bearer. The present disclosure may address the issues and/or problems in determining which radio bearer for the one or more UE to achieve high-speed and high efficiency wireless communication between the RAN and the one or more UE.

SUMMARY

This document relates to methods, systems, and devices for wireless communication, and more specifically, for selecting a radio bearer mode for multicast broadcast services (MBS).

In one embodiment, the present disclosure describes a method for wireless communication. The method includes informing a radio access network (RAN) that a user equipment (UE) is receiving/interested to receive or no longer receiving/interested to receive multicast broadcast service (MBS) services via a cast mode. The method includes sending, by the UE, MBS interest information to the RAN, the MBS interest information comprising a list of MBS services of interest.

In another embodiment, the present disclosure describes a method for wireless communication. The method includes sending, by a core network (CN), a multicast broadcast service (MBS) session management information to a radio access network (RAN), the MBS session management information comprising at least one of an MBS session identity, a list of MBS service identity information associated with an MBS session, a list of quality of flow (QoS) flow identities associated to the MBS session, a list of user equipment (UE) identities joining the MBS session.

In another embodiment, the present disclosure describes a method for wireless communication. The method includes sending, by a next generation radio access network node distributed unit (gNB-DU), multicast broadcast service (MBS) resource status information to a gNB central unit (gNB-CU) to inform the gNB-CU about a resource status for an MBS service in the gNB-DU.

In another embodiment, the present disclosure describes a method for wireless communication. The method includes sending, by a next generation radio access network node distributed unit (gNB-DU), multicast broadcast service (MBS) notify information to a gNB central unit (gNB-CU) to inform the gNB-CU that a quality of service (QoS) of an already established guaranteed bit rate (GBR) radio bearer (RB) associated with an MBS session cannot by fulfilled any longer or that it can be fulfilled again.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 10 shows a flow diagram of another method for wireless communication.

FIG. 11 shows an exemplary logic flow of the method for wireless communication in FIG. 10.

DETAILED DESCRIPTION

Figure 1A:
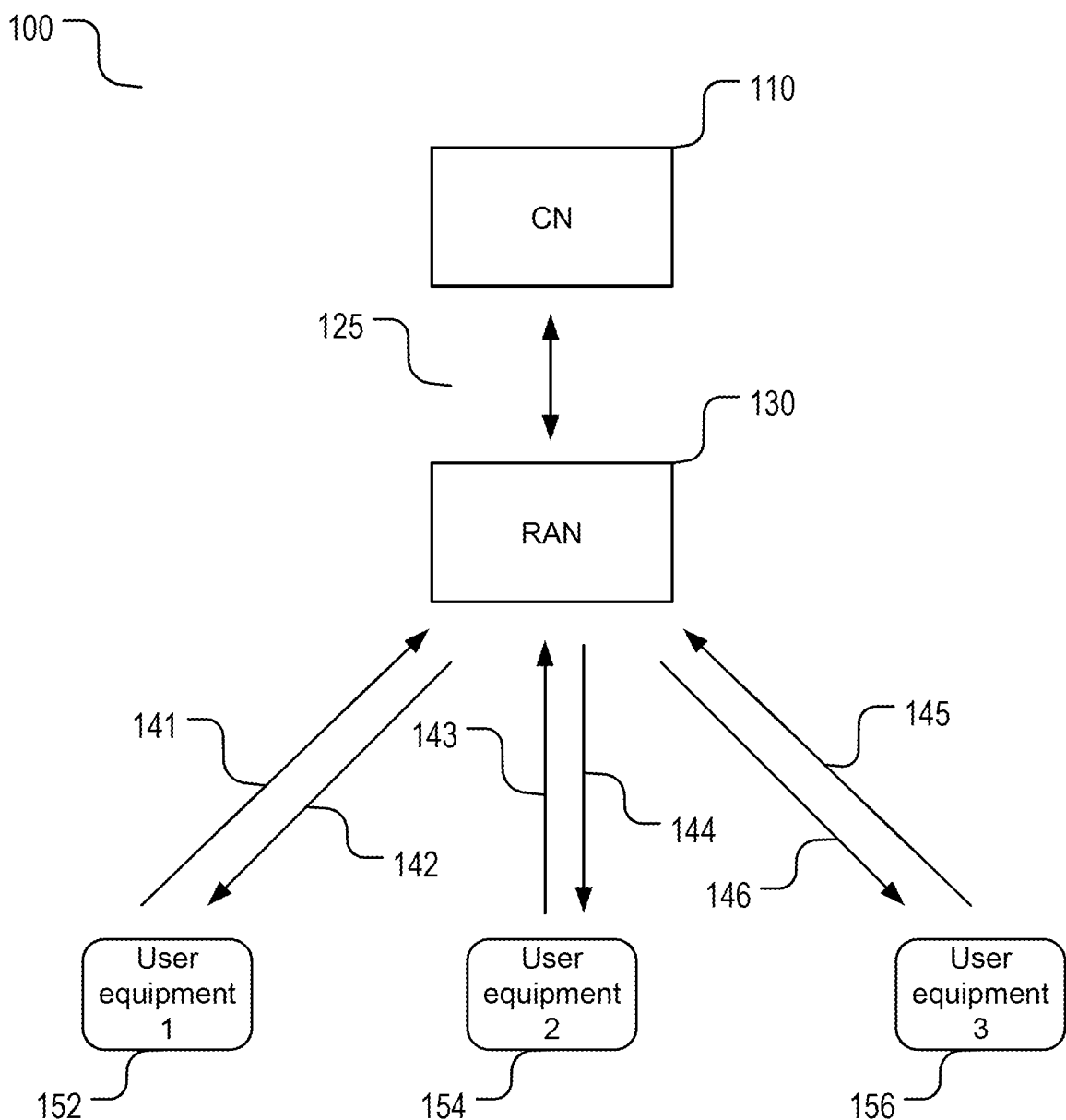
FIG. 1A shows an example of a point-to-point (PTP) radio bearer in a wireless communication system.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for selecting a radio bearer mode for multicast broadcast services (MBS).

Next generation (NG), or 5th generation (5G), wireless communication may provide a range of capabilities from downloading with fast speeds to support real-time low-latency communication. The wireless communication may use a radio bearer (RB) for multicast broadcast services (MBS). This range of capabilities may need some characteristics of quantity of service (QoS), such as delay, error rate, priority level, and etc. In NG wireless communication, one or more service data flows with same QoS characteristics may be grouped together as a QoS flow. Each QoS flow may be identified by a QoS flow identifier, informing the network components the corresponding characteristics of the QoS flow.

Figure 1B:
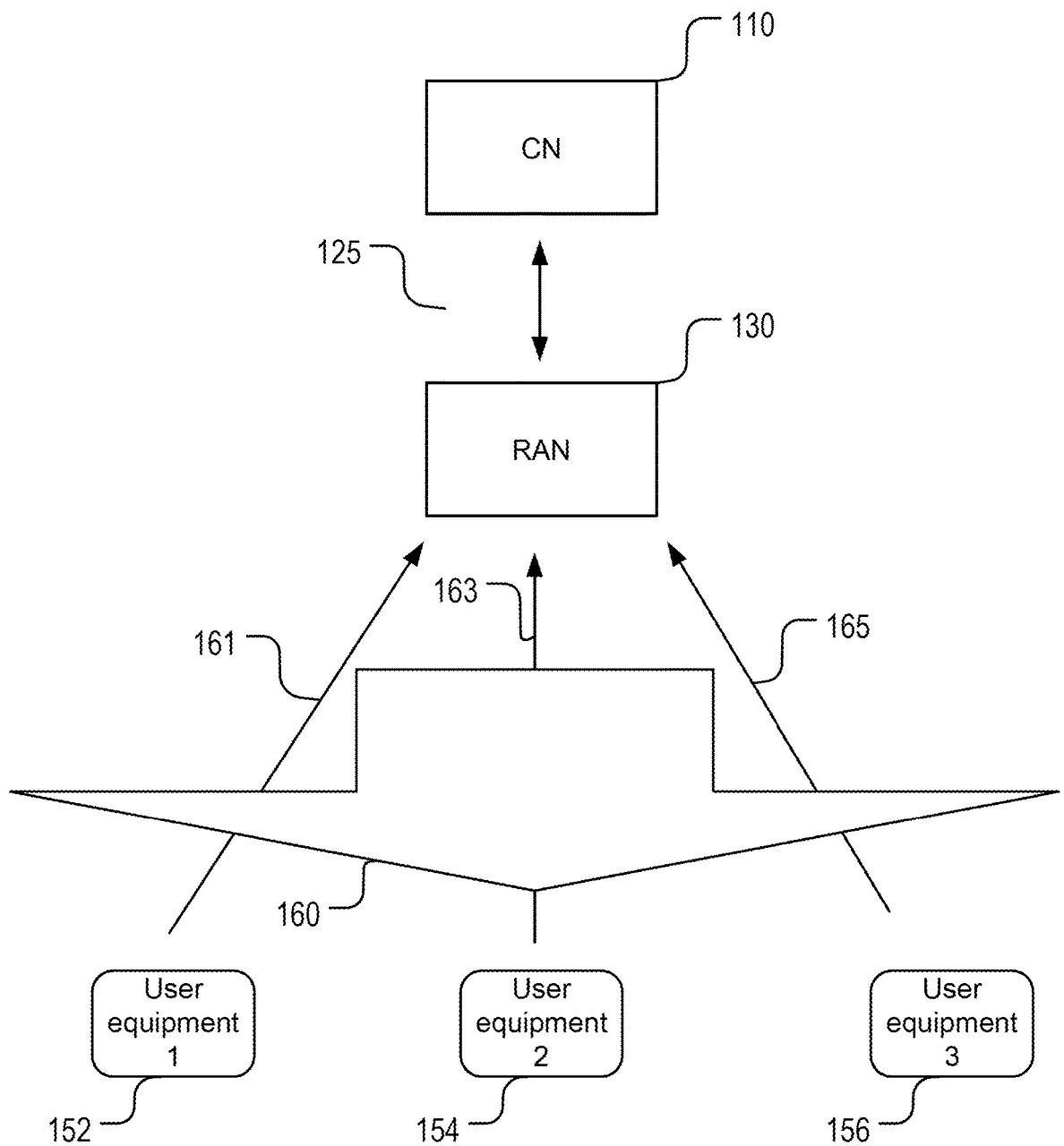
FIG. 1B shows an example of a point-to-multipoint (PTM) radio bearer in a wireless communication system.

FIGS. 1A and 1B show various transmission modes for a wireless communication system 100 including a core network (CN) 110, a radio access network (RAN) 130, and one or more user equipment (UE) (152, 154, and 156). The RAN 130 may include a wireless network base station, or a NG radio access network (NG-RAN) base station or node, which may include a nodeB (NB, e.g., a gNB) in a mobile telecommunications context. In one implementation, the core network 110 may include a 5G core network (5GC), and the interface 125 may include a NG interface. The RAN 130 (e.g, gNB) may include an architecture of separating a central unit (CU) and one or more distributed units (DUs).

The communication between the RAN and the one or more UE may include at least one radio bearer (RB) for multicast broadcast services (MBS). UEs may use two different cast modes for RB to receive MBS data. One cast mode may be point-to-point (PTP) or unicast, another cast mode may be point-to-multipoint (PTM) or multicast or broadcast. The PTP cast mode and unicast cast mod may refer to a same cast mode. A PTP RB may be a DRB, a PTM RB may be a multicast RB or a broadcast RB. FIG. 1A shows a PTP cast mode for the one or more UE for MBS; and FIG. 1B shows a PTM cast mode for the one or more UE for MBS.

Referring to FIG. 1A, a first UE 152 may wirelessly receive from the RAN 130 via a PTP RB 142 and wirelessly send communication to the RAN 130 via a uplink channel 141. Likewise, a second UE 154 may wirelessly receive communicate from the RAN 130 via a PTP RB 144 and wirelessly send communication to the RAN 130 via a uplink channel 143; and a third UE 156 may wirelessly receive communicate from the RAN 130 via a PTP RB 146 and wirelessly send communication to the RAN 130 via a uplink channel 145.

Referring to FIG. 1B, the RAN 130 may wirelessly communicate to one or more UEs (152, 154, and 156) via a PTM RB 160. In one implementation, the first UE 152 may wirelessly send communication to the RAN 130 via a uplink channel 161. Likewise, the second UE 154 may wirelessly send communication to the RAN 130 via a uplink channel 163; and the third UE 156 may wirelessly send communication to the RAN 130 via a uplink channel 165.

In the wireless communication system 100 in FIGS. 1A and 1B, the RAN 130 may select which cast mode one UE uses for MBS, in order to improve high efficiency of the wireless network. The cast mode selection may depends on various types of information, for example but not limited to, a load condition for MBS, a working status of UE in a PTP cast mode or a PTM cast mode, or a cast mode interest indication of the UE. There are some problems associated with selecting which cast mode for MBS, for example, how the UE sends the UE's interested cast modes for MBS to the RAN. The present disclosure describes embodiments of methods and devices for selecting a radio bearer mode for MBS, addressing at least one of the problems discussed above.

Figure 2:
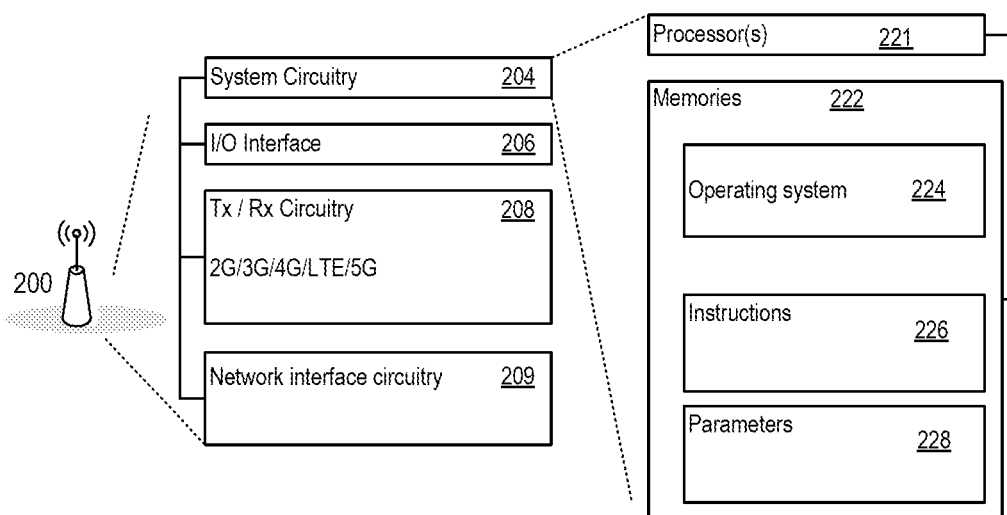
FIG. 2 shows an example of a wireless network node.

FIG. 2 shows an exemplary a radio access network or a wireless communication base station 200. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
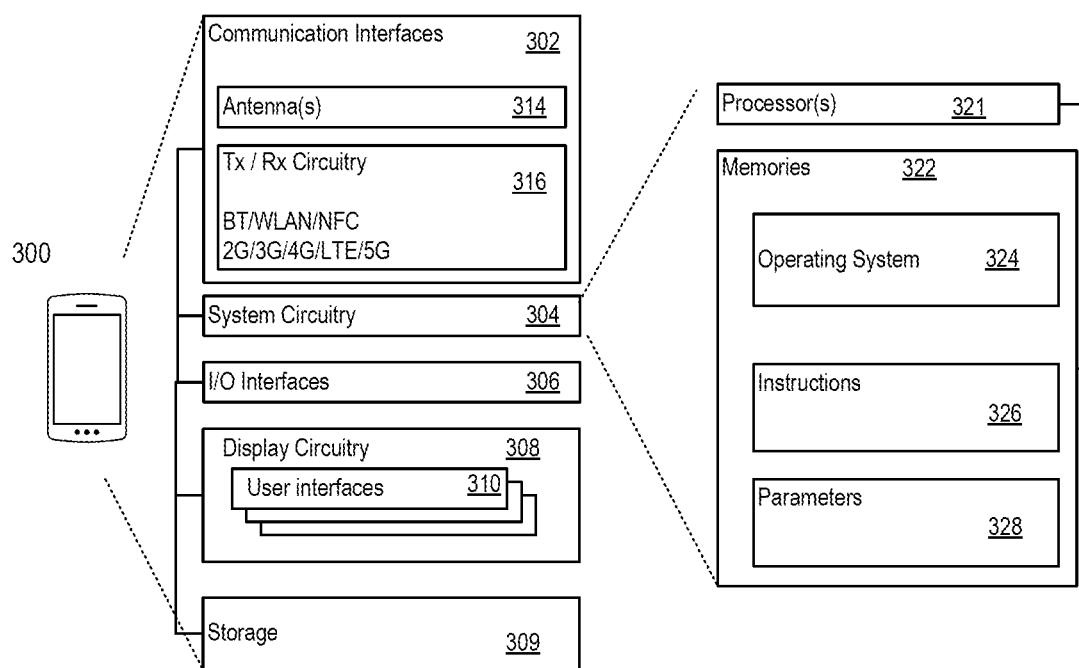
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for selecting a radio bearer mode for multicast broadcast services (MBS), which may be implemented, partly or totally, on the wireless network base station and/or the user equipment described above in FIGS. 2 and 3.

Figures 4, 5:
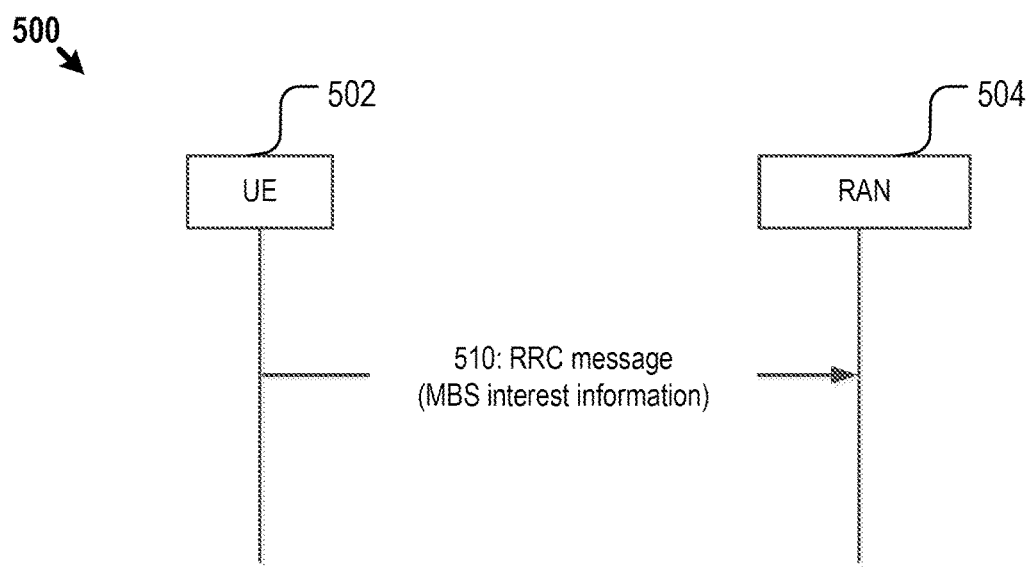
FIG. 4 shows a flow diagram of a method for wireless communication.
FIG. 5 shows an exemplary logic flow of the method for wireless communication in FIG. 4.

In one embodiment, referring to FIG. 4, a method 400 for wireless communication includes using a multicast broadcast service (MBS) interest information to informing a radio access network (RAN) that a user equipment (UE) is receiving/interested to receive or no longer receiving/interested to receive MBS services via a cast mode. The method 400 may include step 410: sending, by the UE, an MBS interest information to the RAN, the MBS interest information comprising a list of MBS services of interest. The MBS interest information may be carried in a radio resource control (RRC) message. The method 400 may inform the RAN the UE's interest to use PTP cast mode and/or PTM cast mode.

In one implementation, the MBS interest information further includes a cast mode interest indication for each item in the list of MBS services of interest, the cast mode interest indication indicating UE's interested cast modes to receive a corresponding MBS service.

In another implementation, the MBS interest information further includes a cast mode interest indication for the UE, the cast mode interest indication indicating UE's interested cast modes to receive all MBS services of interest.

In another implementation, the MBS interest information further includes at least one cast mode interest indication, each cast mode interest indication corresponds to a subset of the list of MBS services of interest, the cast mode interest indication indicating UE's interested cast modes to receive the corresponding MBS services.

Optimally, a trigger condition to send the MBS interest information comprises upon change of cast mode interest. The trigger condition to send the MBS interest information includes at least one of upon change of cast mode interest, upon successful connection establishment, upon entering or leaving the service area, upon MBS session start or stop, upon change of interest, upon change of priority between MBMS reception and unicast reception, upon change to a PCell broadcasting system information about service area identities.

In one implementation as shown in FIG. 5, the UE 502 may receive a system information containing the MBS Service Area Identities (SAI) of the current and/or neighbouring carrier frequencies prior to sending the RRC message. In another implementation, the list of interested MBS services may include at least one of the following: one or more MBS services that UE is currently receiving, and/or one or more MBS services that UE is interested to receive and are about to begin. In another implementation, each item in the list of interested MBS services may include at least one of MBS service identity, a set of quality of flow (QoS) flow identity, IP multicast address, IP source address, or an MBS session identity. For example but not limited to, the MBS service identity may include a temporary mobile group identity (TMGI).

The cast mode interest indication may include a first value, which indicates that the UE is interested to use a point-to-point (PTP) cast mode for the one or more corresponding MBS services of interest. For example but not limited to, the first value may include a PTP.

The cast mode interest indication may include a second value, the cast mode interest indication indicates that the UE is interested to use a point-to-multiple (PTM) cast mode for the one or more corresponding MBS services. For example but not limited to, the second value may include a PTM.

The cast mode interest indication may include a third value, the cast mode interest indication indicates that the UE is interested to use the PTP cast mode or the PTM cast mode for the one or more corresponding MBS services, and optionally the PTP cast mode has a higher priority than the PTM cast mode. For example but not limited to, the third value may include a <PTP, PTM>.

The cast mode interest indication may include a fourth value, the cast mode interest indication indicates that the UE is interested to use the PTP cast mode or the PTM cast mode for the one or more corresponding MBS services, and optionally the PTM cast mode has a higher priority than the PTP cast mode. For example but not limited to, the fourth value may include a <PTM, PTP>.

The cast mode interest indication may include a fifth value, the cast mode interest indication indicates that the UE does not have any interest in using which cast mode for the one or more corresponding MBS services of interest. For example but not limited to, the fifth value may include a blank.

The cast mode interest indication may include a sixth value, the cast mode interest indication indicates that the UE is interested to use both PTP cast mode and PTM cast mode simultaneously for the one or more corresponding MBS services of interest. For example but not limited to, the sixth value may include a <PTM+PTP>.

Figures 6, 7:
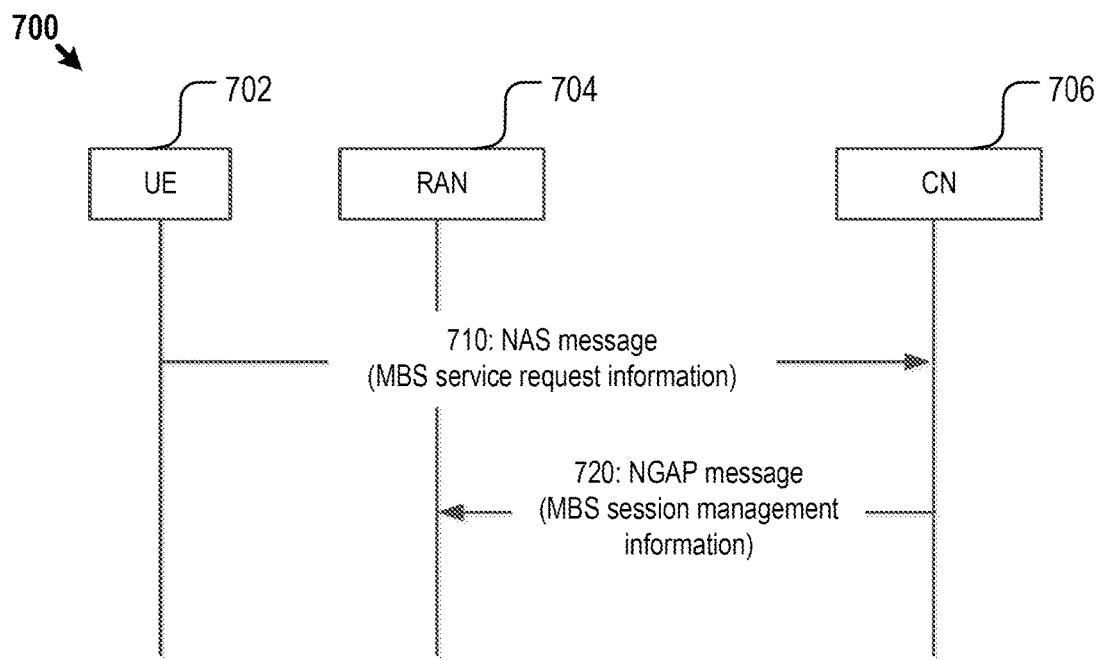
FIG. 6 shows a flow diagram of another method for wireless communication.
FIG. 7 shows an exemplary logic flow of the method for wireless communication in FIG. 6.

In another embodiment, referring to FIG. 6, a method 600 for wireless communication includes using a non-access stratum (NAS) message and a next generation application protocol (NGAP) message to select a radio bearer mode for a multicast broadcast service (MBS) from a user equipment (UE) to a radio access network (RAN). The method 600 may include a portion or all of the following steps: step 610: sending, by a user equipment (UE), an MBS service request information to a core network (CN), the MBS service request information comprising an MBS service identity information corresponding to a requested MBS service and an cast mode interest indication indicating UE's interested cast modes to receive the MBS service; and step 620: sending, by the core network (CN), a multicast broadcast service (MBS) session management information to a radio access network (RAN). The MBS session management information may be an MBS session start information, or an MBS session update information, or an MBS session setup information, or an MBS session modification information. The MBS session management information may include at least one of an MBS session identity, a list of MBS service identity information associated with the MBS session identity, a list of quality of flow (QoS) flow identities associated to the MBS session, a list of user equipment (UE) identities joining the MBS session.

FIG. 7 shows an exemplary logic flow of a method 700 for using a non-access stratum (NAS) message and a next generation application protocol (NGAP) message to indicate a cast mode of a user equipment (UE) 702 for a multicast broadcast service (MBS) from a core network (CN) 706 to a radio access network (RAN) 704. The RAN 704 may include a gNB-CU. The CN may include an AMF.

The method 700 may include step 710: the UE 702 sends the NAS message to a CN 706. The NAS message may include an MBS service request information, the MBS service request message may include an MBS service identity information corresponding to a requested MBS service and an cast mode interest indication indicating UE's interested cast modes to receive the corresponding MBS service. In one implementation, the MBS service identity information may include at least one of an MBS service identity, an MBS session identity and a set of quality of flow (QoS) flow identities, an MBS session identity, IP multicast address, IP source address, and a TMGI.

The method 700 may also include step 720: the CN 706 sends the NGAP message to a RAN 704. The NGAP message may include an MBS session management information. The MBS session management information may be an MBS session start information, or an MBS session update information, or an MBS session setup information, or an MBS session modification information. In one implementation, the MBS session management information may include at least one of an MBS service identity or a list of the MBS service identities associated with the MBS session, an MBS session identity, a list of quality of flow (QoS) flow identities, a list of UE identities joining the MBS session.

The MBS session management information may include a cast mode indication indicating UE's interested cast modes to receive the corresponding one or more MBS services, and/or indicating CN's determined cast modes for the UE to receive the corresponding one or more MBS services. In one implementation, the MBS session management information further includes a cast mode indication for each item in the list of UE identities. In another implementation, the MBS session management information further includes a cast mode indication for each item in the list of UE identities for each item in the list of MBS service identity information. In another implementation, the MBS session management information further includes at least one cast mode indication, each cast mode interest indication corresponds to a subset of the list of MBS services of interest.

The cast mode indication or the cast mode interest indication may include a first value, which indicates that a point-to-point (PTP) cast mode is decided by the CN for the UE or is interested by the UE for the one or more corresponding MBS services of interest. For example but not limited to, the first value may include a PTP.

The cast mode indication or the cast mode interest indication may include a second value, the cast mode interest indication indicates that a point-to-multiple (PTM) cast mode is decided by the CN for the UE or is interested by the UE for the one or more corresponding MBS services. For example but not limited to, the second value may include a PTM.

The cast mode indication or the cast mode interest indication may include a third value, the cast mode interest indication indicates that the PTP cast mode and/or the PTM cast mode is decided by the CN for the UE or is interested by the UE for the one or more corresponding MBS services, and optionally the PTP cast mode has a higher priority than the PTM cast mode. For example but not limited to, the third value may include a <PTP, PTM>.

The cast mode indication or the cast mode interest indication may include a fourth value, the cast mode interest indication indicates that the PTP cast mode and/or the PTM cast mode is decided by the CN for the UE or is interested by the UE for the one or more corresponding MBS services, and optionally the PTM cast mode has a higher priority than the PTP cast mode. For example but not limited to, the fourth value may include a <PTM, PTP>.

The cast mode indication or the cast mode interest indication may include a fifth value, the cast mode interest indication indicates that no cast mode is decided by the CN for the UE or is interested by the UE for the one or more corresponding MBS services of interest. For example but not limited to, the fifth value may include a blank.

The cast mode indication or the cast mode interest indication may include a sixth value, the cast mode interest indication indicates that both PTP cast mode and PTM cast mode are decided by the CN for the UE or is interested by the UE simultaneously for the one or more corresponding MBS services of interest. For example but not limited to, the sixth value may include a <PTM+PTP>.

Figures 8, 9:
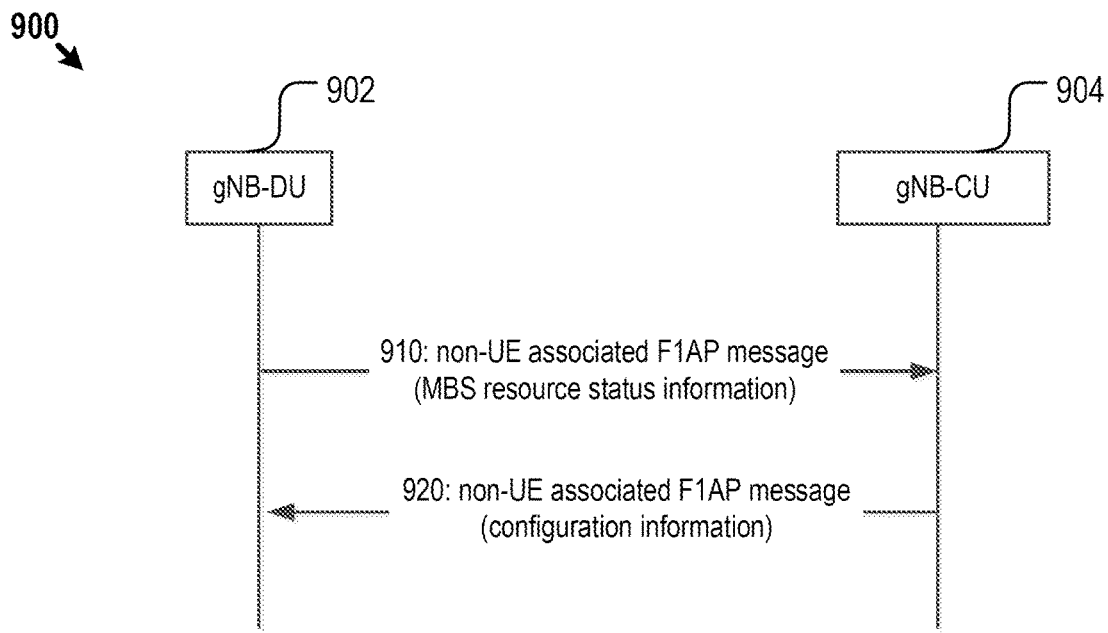
FIG. 8 shows a flow diagram of another method for wireless communication.
FIG. 9 shows an exemplary logic flow of the method for wireless communication in FIG. 8.

In another embodiment, referring to FIG. 8, a method 800 for wireless communication includes using a non-user equipment (non-UE) associated F1AP message to transmit a load status of a next generation radio access network node distributed unit (gNB-DU) for multicast broadcast service (MBS) services to a gNB central unit (gNB-CU). The method 800 may include step 810: sending, by a next generation radio access network node distributed unit (gNB-DU), multicast broadcast service (MBS) resource status information to a gNB central unit (gNB-CU) to inform the gNB-CU about a resource status for an MBS service in the gNB-DU. In one implementation, the gNB-DU may send a non-UE associated F1AP message to the gNB-CU, the non-UE associated F1AP message comprising an MBS load indication indicating the load status of the gNB-DU for the MBS service.

FIG. 9 shows an exemplary logic flow of a method 900 for using a non-user equipment (non-UE) associated F1AP message to transmit a load status of a next generation radio access network node distributed unit (gNB-DU) 902 for multicast broadcast service (MBS) services to a gNB central unit (gNB-CU) 904.

The method 900 may include step 910: the gNB-DU 902 sends the non-UE associated F1AP message to the gNB-CU 904. The non-UE associated F1AP message may include an MBS resource status information to inform the gNB-CU about a resource status for MBS services in the gNB-DU or a cell of the gNB-DU. In one implementation, the MBS resource status information comprises an MBS load indication indicating whether the gNB-DU is overloaded for MBS services. In another implementation, the MBS resource status information comprises a ratio of resource occupied by MBS services in gNB-DU. In another implementation, the MBS resource status information comprises a cell MBS load indication indicating whether each cell of the gNB-DU is overloaded for MBS services. In another implementation, the MBS resource status information comprises a ratio of radio resource occupied by MBS services in each cell of the gNB-DU.

In one implementation, the method 900 may further includes: in response to the MBS load indication indicating that the gNB-DU or the cell is overloaded for MBS services, the gNB-CU 904 applies overload reduction actions for the MBS services. The overload reduction actions may be applied until the overload condition is resolved. When the overload condition is resolved and a not-overloaded condition occurs, the gNB-DU 902 may send a new MBS load indication to the gNB-CU 904, which indicates a not-overloaded status. Thus, in response to an ongoing overload reduction actions and the new MBS load indication indicating a not-overloaded status, the gNB-CU stops the ongoing overload reduction actions for the MBS services. The detailed overload reduction policy may be determined and implemented by the gNB-CU 904.

In another implementation, the method 900 may alternatively and optionally include step 920: the gNB-CU 904 sends a second non-UE associated F1AP message to the gNB-DU 902. The second non-UE associated F1AP message may include a configuration information for the MBS load indication, the configuration information comprising an MBS load threshold. When an MBS load condition is higher than the MBS load threshold, the gNB-DU 902 determines the MBS load indication as overloaded; and when an MBS load condition is not higher than the MBS load threshold, the gNB-DU 902 determines the MBS load indication as not-overloaded. In one implementation, the step 920 may be performed before step 910. In another implementation, the step 920 may be performed after step 920.

In another implementation, the MBS load indication may include at least one of the following information element (IE): a message type, a transaction ID, and/or a gNB-DU load status for MBS, and/or a list of cell identities in the gNB-DU. For each cell identity, the MBS load indication further include a cell load status for MBS. For example but not limited to, the gNB-DU load status for MBS may indicate the overload information in gNB-DU for MBS that has an enumerated value including over-loaded and not-overloaded, or a value of at least one of over-loaded or not-overloaded. In another implementation, the gNB-DU load status for MBS may indicate the ratio of the resources occupied by MBS services in gNB-DU that has a value ranging from 0 to 1, inclusive (i.e., [0, 1]). For example but not limited to, the IE indicating the cell load status for MBS may indicate the overload information in the corresponding cell for MBS that has an enumerated value including over-loaded and not-overloaded, or a value of at least one of over-loaded or not-overloaded. In another implementation, the IE indicating the cell load status for MBS may indicate the ratio of the resources occupied by MBS services in the corresponding cell that has a value ranging [0, 1]. In another embodiment, referring to FIG. 10, a method 1000 for wireless communication includes using a F1AP message to transmit a usage status of at least one radio bearer (RB) for an MBS session from a next generation radio access network node distributed unit (gNB-DU) to a gNB central unit (gNB-CU). The method 1000 may include step 1010: sending, by a next generation radio access network node distributed unit (gNB-DU), multicast broadcast service (MBS) notify information to a gNB central unit (gNB-CU) to inform the gNB-CU that a quality of service (QoS) of an already established guaranteed bit rate (GBR) radio bearer (RB) associated with an MBS session cannot by fulfilled any longer or that it can be fulfilled again.

The purpose of an MBS notify procedure may be to enable the gNB-DU to inform the gNB-CU that a quality of service (QoS) of an already established guaranteed bit rate (GBR) radio bearer (RB) associated with an MBS session cannot by fulfilled any longer or that it can be fulfilled again. In one implementation, the procedure may use MBS Session-associated signaling. In another implementation, the procedure may use UE-associated signaling. In another implementation, the procedure may use non-UE-associated signaling.

In one implementation, the RB includes at least one of a point-to-multipoint (PTM) radio bearer, and optionally a data RB (DRB).

FIG. 11 shows an exemplary logic flow of a method 1100 for using a F1AP message to transmit a usage status of at least one radio bearer (RB) for an MBS session from a next generation radio access network node distributed unit (gNB-DU) 902 to a gNB central unit (gNB-CU) 904.

The method 1100 may include step 1110: the gNB-DU 1102 sends the F1AP message to the gNB-CU 1104. The F1AP message may include an MBS notify information, and the MBS notify information may indicate the usage status of at least one RB for the MBS session. In one implementation, the MBS notify information comprises a list of GRB PTM cast mode of RBs and optionally a list of GRB DRBs associated with notification control for which the QoS is not fulfilled anymore or for which the QoS is fulfilled again by the gNB-DU.

In one implementation, in response to receiving the MBS notify indication, the gNB-CU 1104 identifies a subset of the at least one RB which has a fulfilled status. In another implementation, in response to receiving the MBS notify indication, the gNB-CU 1104 identifies a subset of the at least one RB which has a non-fulfilled status.

The gNB-CU 1104 identifies which QoS flows and MBS session are affected and inform a core network that the QoS for the MBS session or these QoS flows is not fulfilled any longer or it is fulfilled again.

In another implementation, referring to Table 1, the MBS notify indication may include PTM cast mode of RBs. The MBS notify indication may include at least one information element (IE) of: a gNB-CU MBS F1AP identity (ID), a gNB-DU MBS F1AP identity, an MBS session identity, an MBS service identity, and a point-to-multipoint (PTM) RB (MRB) notify list. Each of the MRB notify list may include a point-to-multipoint (PTM) RB notify list, wherein each of the PTM RB notify list comprises a cell identity, a MRB identity, and a MRB notification cause. The MRB notify list corresponds to a list of point-to-multipoint (PTM) RBs; and each item in the list of MRB notification causes may include an enumerated value including fulfilled and not-fulfilled or a value of at least one of fulfilled or not-fulfilled. For example but not limited to, the MBS service identity may include a temporary mobile group identity (TMGI).

TABLE 1

MBS NOTIFY INDICATION

| IE/Group Name | IE type and reference |
|---|---|
| Message Type | |
| gNB-CU MBS F1AP ID | |
| gNB-DU MBS F1AP ID | |
| MBS Session ID | |
| MBS Service ID | |
| DRB Notify List | |
| >DRB Notify Item IEs | |
| >>gNB-CU UE F1AP ID | |
| >>gNB-DU UE F1AP ID | |
| >>DRB ID | |
| >>Notification Cause | ENUMERATED(Fulfilled, Not-Fulfilled, ...) |
| MRB Notify List | |
| >MRB Notify Item IEs | |
| >>Cell ID | |
| >>PTM RB ID | |
| >>Notification Cause | ENUMERATED(Fulfilled, Not-Fulfilled, ...) |

Optionally, referring to Table 1, the MBS notify indication may further include PTP cast mode of RB. The MBS notify indication may further include a data RB (DRB) notify list. Each of the DRB notify list may include a gNB-CU user equipment (UE) F1AP identity, a gNB-DU UE F1AP identity, a list of DRB identities, and a list of DRB notification causes corresponding to the list of DRB identities. The DRB notify list corresponds to a list of point-to-point (PTP) RBs; and each item in the list of DRB notification causes may include an enumerated value including fulfilled and not-fulfilled or a value of at least one of fulfilled or not-fulfilled.

The present disclosure describes methods, apparatus, and computer-readable medium for wireless communication. The present disclosure addressed the issues with selecting a radio bearer mode for multicast broadcast services (MBS). The methods, devices, and computer-readable medium described in the present disclosure may facilitate the performance of wireless communication by selecting a PTP or PTM cast mode for one or more corresponding MBS services, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for multicast broadcast service (MBS) in wireless communication, comprising:
    informing a radio access network (RAN) that a user equipment (UE) is receiving, or is interested to receive, or is no longer receiving, or is no longer interested to receive multicast broadcast service (MBS) services via a cast mode by:
        before sending a radio resource control (RRC) message, receiving, by the UE from the RAN, MBS service area identities of current and neighbouring carrier frequencies; and
        upon changing to a primary cell (PCell) broadcasting system information about the service area identities, sending, by the UE to the RAN, the RRC message comprising MBS interest information, the MBS interest information comprising a list of MBS services of interest,
    wherein:
        the MBS interest information comprises a cast mode interest indication,
        the cast mode interest indication comprises one of a plurality of values comprising a value indicating that the UE is interested to use both a point-to-point (PTP) cast mode and point-to-multiple (PTM) cast mode simultaneously, and
        the plurality of values comprises at least one of the following:

a first value to indicate that the UE is interested to use the PTP cast mode;
a second value to indicate that the UE is interested to use the PTM cast mode;
a third value to indicate that the UE is interested to use the PTP cast mode and the PTM cast mode with the PTP cast mode having a higher priority than the PTM cast mode;
a fourth value to indicate that the UE is interested to use the PTP cast mode and the PTM cast mode with the PTM cast mode having a higher priority than the PTP cast mode; or
a fifth value to indicate that the UE does not have any specific interest in using which cast mode.

2. The method according to claim 1, wherein:
for each item in the list of MBS services of interest, the MBS interest information comprises the cast mode interest indication indicating UE's interested cast modes to receive a corresponding MBS service.

3. The method according to claim 1, wherein:
the cast mode interest indication indicates UE's interested cast modes to receive all MBS services of interest.

4. The method according to claim 1, wherein:
each item in the list of MBS services of interest comprises at least one of a MBS service identity, a set of quality of flow (QOS) flow identity, a MBS session identity, an IP multicast address, an IP source address, or a temporary mobile group identity (TMGI).

5. The method according to claim 1, wherein:
the trigger condition comprises upon change of cast mode interest.

6. An apparatus for multicast broadcast service (MBS) in wireless communication, comprising:
a memory storing instructions; and
a processor in communication with the memory, wherein, when the processor executes the instructions, the processor is configured to cause the apparatus to perform:
informing a radio access network (RAN) that the apparatus is receiving, or is interested to receive, or is no longer receiving, or is no longer interested to receive multicast broadcast service (MBS) services via a cast mode by:
before sending a radio resource control (RRC) message, receiving, from the RAN, MBS service area identities of current and neighbouring carrier frequencies; and
upon changing to a primary cell (PCell) broadcasting system information about the service area identities, sending, to the RAN, the RRC message comprising MBS interest information, the MBS interest information comprising a list of MBS services of interest,
wherein:
the MBS interest information comprises a cast mode interest indication,
the cast mode interest indication comprises one of a plurality of values comprising a value indicating that the UE is interested to use both a point-to-point (PTP) cast mode and point-to-multiple (PTM) cast mode simultaneously, and
the plurality of values comprises at least one of the following:
a first value to indicate that the UE is interested to use the PTP cast mode;
a second value to indicate that the UE is interested to use the PTM cast mode;
a third value to indicate that the UE is interested to use the PTP cast mode and the PTM cast mode with the PTP cast mode having a higher priority than the PTM cast mode;
a fourth value to indicate that the UE is interested to use the PTP cast mode and the PTM cast mode with the PTM cast mode having a higher priority than the PTP cast mode; or
a fifth value to indicate that the UE does not have any specific interest in using which cast mode.

7. The apparatus according to claim 6, wherein:
for each item in the list of MBS services of interest, the MBS interest information comprises the cast mode interest indication indicating apparatus's interested cast modes to receive a corresponding MBS service.

8. The apparatus according to claim 6, wherein:
the cast mode interest indication indicates apparatus's interested cast modes to receive all MBS services of interest.

9. The apparatus according to claim 6, wherein:
each item in the list of MBS services of interest comprises at least one of a MBS service identity, a set of quality of flow (QOS) flow identity, a MBS session identity, IP multicast address, IP source address, or a temporary mobile group identity (TMGI).

10. The apparatus according to claim 6, wherein:
the trigger condition comprises upon change of cast mode interest.

11. A computer program product comprising a non-transitory computer-readable program medium storing instructions for multicast broadcast service (MBS) in wireless communication, wherein, the instructions, when executed by a processor of a user equipment (UE), are configured to cause the processor to perform:
informing a radio access network (RAN) that the UE is receiving, or is interested to receive, or is no longer receiving, or is no longer interested to receive multicast broadcast service (MBS) services via a cast mode by:
before sending a radio resource control (RRC) message, receiving, from the RAN, MBS service area identities of current and neighbouring carrier frequencies; and
upon changing to a primary cell (PCell) broadcasting system information about the service area identities, sending, to the RAN, the RRC message comprising MBS interest information, the MBS interest information comprising a list of MBS services of interest,
wherein:
the MBS interest information comprises a cast mode interest indication,
the cast mode interest indication comprises one of a plurality of values comprising a value indicating that the UE is interested to use both a point-to-point (PTP) cast mode and point-to-multiple (PTM) cast mode simultaneously, and
the plurality of values comprises at least one of the following:
a first value to indicate that the UE is interested to use the PTP cast mode;
a second value to indicate that the UE is interested to use the PTM cast mode;
a third value to indicate that the UE is interested to use the PTP cast mode and the PTM cast mode with the PTP cast mode having a higher priority than the PTM cast mode;
a fourth value to indicate that the UE is interested to use the PTP cast mode and the PTM cast mode with the PTM cast mode having a higher priority than the PTP cast mode; or a fifth value to indicate that the UE does not have any specific interest in using which cast mode.

12. A computer program product according to claim 11, wherein:

for each item in the list of MBS services of interest, the MBS interest information comprises the cast mode interest indication indicating UE's interested cast modes to receive a corresponding MBS service.

13. A computer program product according to claim 11, wherein:

the cast mode interest indication indicates UE's interested cast modes to receive all MBS services of interest.

14. A computer program product according to claim 11, wherein:

each item in the list of MBS services of interest comprises at least one of a MBS service identity, a set of quality of flow (QoS) flow identity, a MBS session identity, IP multicast address, IP source address, or a temporary mobile group identity (TMGI).

15. A computer program product according to claim 11, wherein:

the trigger condition comprises upon change of cast mode interest.

* * * * *